(12) United States Patent
Sudo

(10) Patent No.: US 7,940,321 B2
(45) Date of Patent: May 10, 2011

(54) DISPLAY CONTROL APPARATUS, IMAGE PICKUP APPARATUS, CONTROL METHOD THEREFOR, COMPUTER READABLE MEDIUM, AND PROGRAM

(75) Inventor: Koji Sudo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1132 days.

(21) Appl. No.: 11/668,633

(22) Filed: Jan. 30, 2007

(65) Prior Publication Data

US 2007/0276513 A1 Nov. 29, 2007

(30) Foreign Application Priority Data

Feb. 8, 2006 (JP) ................ 2006-031044
Jan. 12, 2007 (JP) ................ 2007-004674

(51) Int. Cl.
*H04N 5/222* (2006.01)
(52) U.S. Cl. ................ 348/333.01; 348/333.12
(58) Field of Classification Search .......... None
See application file for complete search history.

(56) References Cited

U.S. PATENT DOCUMENTS

| 6,724,502 | B1 | 4/2004 | Miyake |
| 7,209,174 | B2 * | 4/2007 | Hanson ............... 348/333.02 |
| 7,443,423 | B2 * | 10/2008 | Yokonuma ............ 348/220.1 |
| 7,557,850 | B2 * | 7/2009 | Abe .................. 348/333.01 |
| 2002/0171747 | A1 * | 11/2002 | Niikawa et al. ....... 348/333.01 |
| 2003/0206239 | A1 | 11/2003 | Battles |
| 2004/0051803 | A1 | 3/2004 | Venturino et al. |
| 2005/0174458 | A1 | 8/2005 | Maniwa |

FOREIGN PATENT DOCUMENTS

| EP | 928098 A2 | 7/1999 |
| EP | 1538829 A1 | 6/2005 |
| JP | 10-250047 A | 9/1998 |
| JP | 2003-259163 A | 9/2003 |
| JP | 2004-104335 A | 4/2004 |
| JP | 2005-072773 A | 3/2005 |
| JP | 2005-223762 A | 8/2005 |

* cited by examiner

*Primary Examiner* — Luong T Nguyen
(74) *Attorney, Agent, or Firm* — Canon USA, Inc. IP Division

(57) ABSTRACT

An image pickup apparatus allows a user to select and set a desired item to be displayed together with an image with a few operations. The user selects a desired item to be displayed together with an image, and stores the selected item as a setting for a display mode. The user can arbitrarily change a plurality of display modes. Further, the user can disable one or a plurality of display modes among the display modes. Therefore, the user does not need to change the display mode to an undesired display mode during changing between the display modes.

12 Claims, 14 Drawing Sheets

FIG. 6

- [icon: folder 1 ✓] EXTERNAL REAR-LCD-PANEL DISPLAY UNIT 1 IS SELECTABLE.
- [icon: folder 1 ⊘] EXTERNAL REAR-LCD-PANEL DISPLAY UNIT 1 IS NOT SELECTABLE.
- [icon: folder 2 ✓] EXTERNAL REAR-LCD-PANEL DISPLAY UNIT 2 IS SELECTABLE.
- [icon: folder 2 ⊘] EXTERNAL REAR-LCD-PANEL DISPLAY UNIT 2 IS NOT SELECTABLE.
- [icon: folder 1 ✓] INTERNAL VIEWFINDER DISPLAY UNIT 1 IS SELECTABLE.
- [icon: folder 1 ⊘] INTERNAL VIEWFINDER DISPLAY UNIT 1 IS NOT SELECTABLE.
- [icon: folder 2 ✓] INTERNAL VIEWFINDER DISPLAY UNIT 2 IS SELECTABLE.
- [icon: folder 2 ⊘] INTERNAL VIEWFINDER DISPLAY UNIT 2 IS NOT SELECTABLE.

FIG. 7

Custom Display

| LCD/Viewfinder | 501 | 502 | 503 | 504 |
|---|---|---|---|---|
| Shooting Info | ✓ | | | |
| Grid Lines | | ✓ | | ✓ |
| Histogram | | ✓ | | |

SET ✓ MENU

SHOOTING INFORMATION ON

GRID LINES ON + HISTOGRAM ON

ALL SETTINGS OFF

GRID LINES ON

SHOOTING INFORMATION ON

GRID LINES ON + HISTOGRAM ON

GRID LINES ON

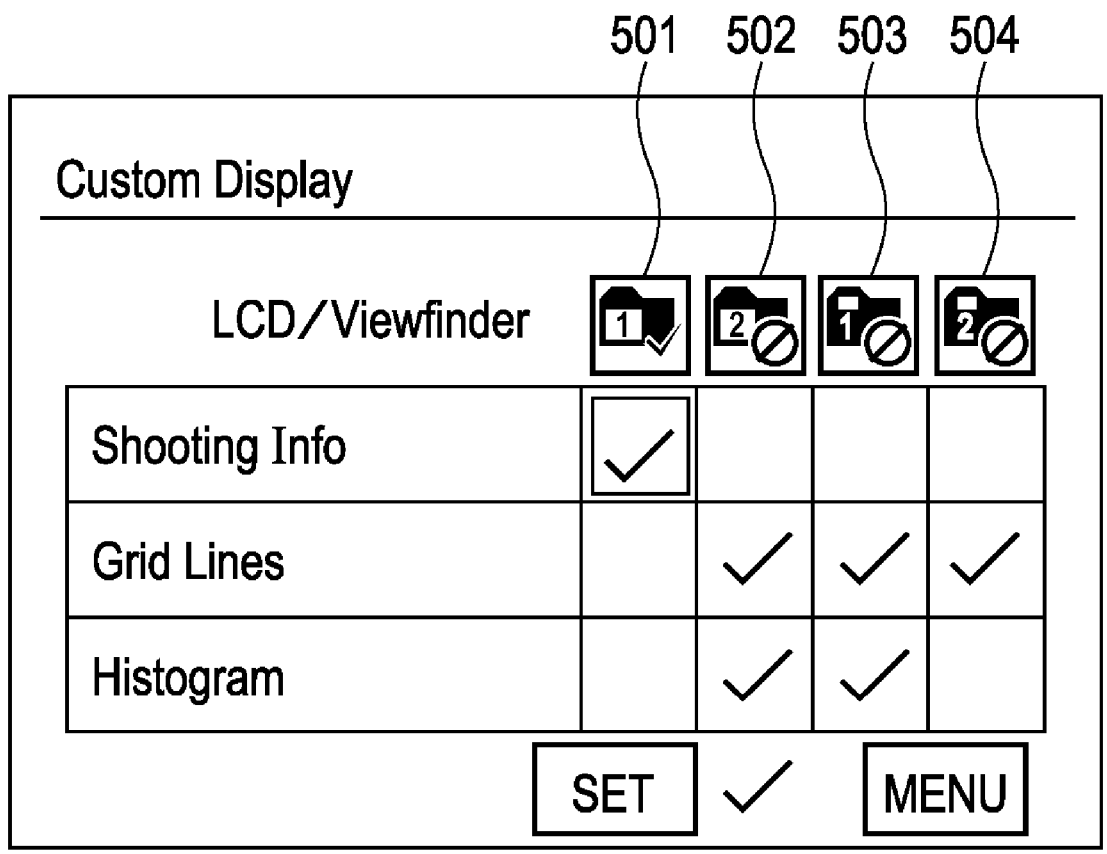

SHOOTING INFORMATION ON

GRID LINES ON + HISTOGRAM ON

GRID LINES ON

DISPLAY CONTROL APPARATUS, IMAGE PICKUP APPARATUS, CONTROL METHOD THEREFOR, COMPUTER READABLE MEDIUM, AND PROGRAM

BACKGROUND OF THE INVENTION

1. Field of the Invention

The present invention relates to a display control apparatus, an image pickup apparatus for capturing, storing, recording, and reproducing a still image or a moving image, a control method for the image pickup apparatus, a computer readable medium, and a program.

2. Description of the Related Art

Recently, in multi-function high-performance digital cameras, there have been increasing demands for easy selection of functions desired by users with a few operations.

In compact digital cameras with a limited number of operating members, however, each of the operating members needs to be assigned more than one function or activity. If a plurality of functions or activities are assigned to a single operating member, the functions of the operating member are changed many times, thus increasing the number of operations to be performed by a user and increasing the complexity of the operations.

It is desirable that the number of operating members be reduced in order to increase the compactness. However, the multi-function high-performance design with a reduced number of operating members can lead to a problem of increasing the number of operations to be performed by a user.

Various techniques have been proposed to solve this problem. One known technique is to prohibit a user from operating a certain range of function parameters so that only a function needed by a photographer can be selectively set.

In this technique, however, whenever a user desires to change the selectable range of parameters, the user needs to change the parameters, which is inconvenient for the user. In this case, it is desirable that some settings that are frequently used by the user be customized and stored.

Another known technique is to switch between a mode for displaying an image on a liquid crystal panel disposed on a rear side of a digital camera and a mode for displaying an image in a viewfinder of the digital camera. For example, a technique for performing display control so as to prevent the display of information from being changed on the viewfinder is disclosed.

In a case where there is a plurality of display modes, however, the display mode changing operation itself is time consuming. For example, a digital camera has four display modes, numbered 1 to 4, and the modes are changed in the order of the mode 1, the mode 2, the mode 3, the mode 4, the mode 1, . . . , each time a button is pressed. In order to change from the mode 2 to the mode 1, the button is pressed three times. Therefore, as the number of display modes increases, the number of operations required for a user to change the modes also increases, resulting in increased complexity.

Therefore, it would be desirable to provide a display control apparatus, an image pickup apparatus for capturing, storing, recording, and reproducing a still image or a moving image, a control method for the image pickup apparatus, a computer readable medium, and a program which solves the aforementioned conventional problems.

SUMMARY OF THE INVENTION

According to an aspect of the present invention, there is provided with a display control apparatus for controlling display of image data on a display unit, including a setting unit configured to set information to be displayed for each of a plurality of display modes; a mode changing unit configured to change the display mode displayed; a display control unit configured to control the display unit to display the information set by the setting unit according to the display mode changed by the mode changing unit; and a disabling setting unit configured to disable a display mode designated by a user from among the display modes, wherein the mode changing unit is operable to change the display modes by sequentially changing display modes that are not disabled by the disabling setting unit.

Further features and aspects of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram illustrating icons representing display monitors according to the first embodiment.

FIG. 7 is a diagram illustrating a display setting screen according to the first embodiment.

FIG. 11 is a diagram illustrating a display setting screen according to the first embodiment.

DESCRIPTION OF THE EMBODIMENTS

Exemplary embodiments of the present invention will be described with reference to the accompanying drawings.

It is to be noted that the embodiments described in this specification are merely exemplary and are not intended to limit the present invention.

First Exemplary Embodiment

[Structure of Image Pickup Apparatus 100]

Figure 1:
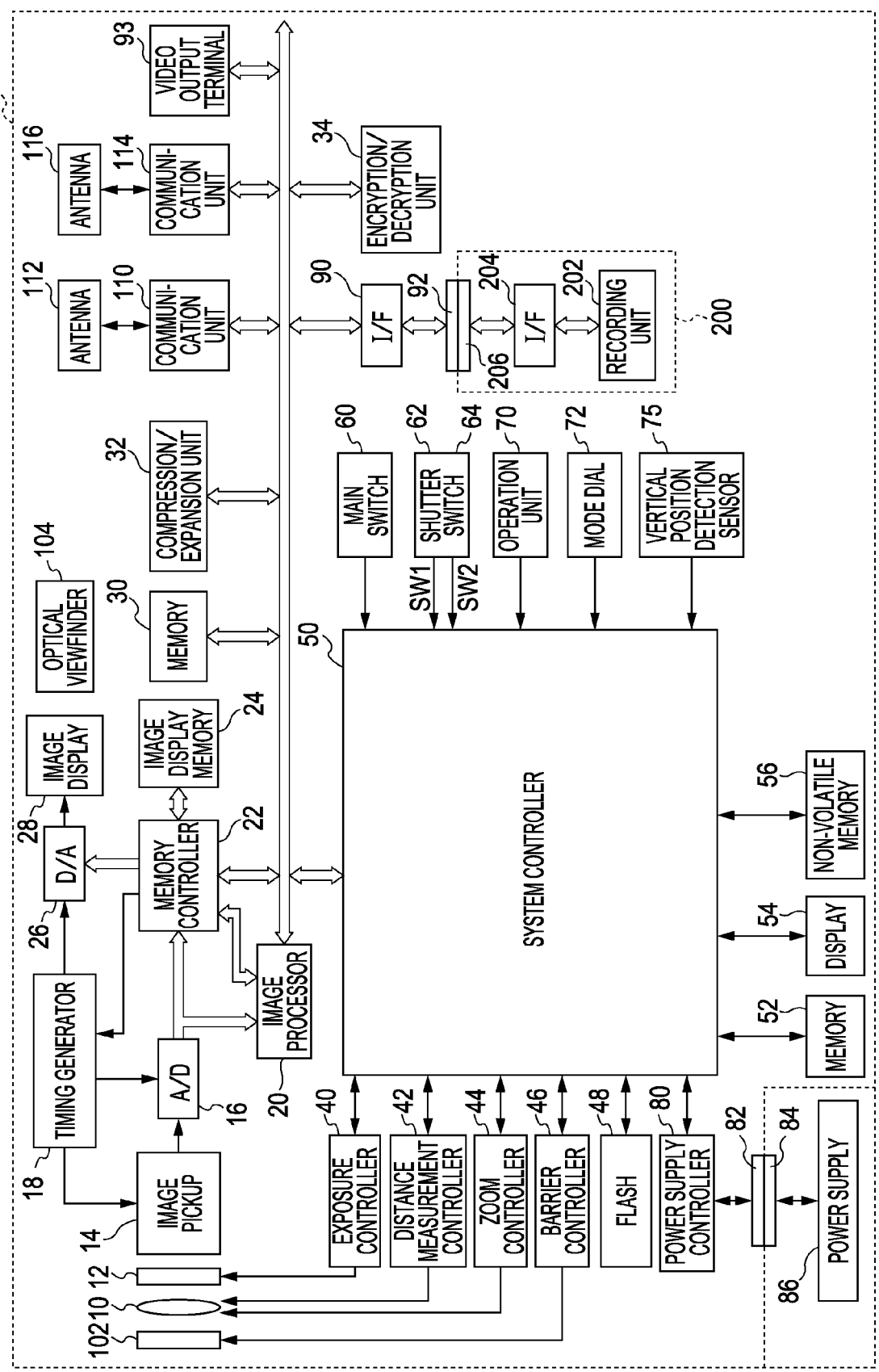
FIG. 1 is a block diagram of an image pickup apparatus according to an embodiment of the present invention.

An image pickup apparatus 100 according to a first embodiment of the present invention will be described with reference to FIG. 1.

The image pickup apparatus 100 includes a lens 10, a shutter 12 having an aperture function, an image pickup device 14 that converts an optical image into an electrical signal, and an analog-to-digital (A/D) converter 16 that converts an analog signal output from the image pickup device 14 into a digital signal.

The image pickup apparatus 100 further includes a timing generation circuit 18, an image processing circuit 20, a memory control circuit 22, an image display memory 24, a digital-to-analog (D/A) converter 26, an image display unit 28, a memory 30, a compression/expansion circuit 32, an encryption/decryption circuit 34, and a system control circuit 50.

The timing generation circuit 18 supplies a clock signal or a control signal to the image pickup device 14, the A/D converter 16, and the D/A converter 26. The timing generation circuit 18 is controlled by the memory control circuit 22 and the system control circuit 50.

The image processing circuit 20 performs predetermined pixel interpolation and color conversion on data from the A/D converter 16 or from the memory control circuit 22.

The image processing circuit 20 further performs predetermined calculation processing using captured image data. Based on the obtained calculation result, the system control circuit 50 controls an exposure controller 40 and a distance measurement controller 42 to perform through-the-lens (TTL) auto focus (AF) processing, auto exposure (AE) processing, and electronic flash pre-emission (EF) processing.

The image processing circuit 20 further performs predetermined calculation processing using the captured image data, and performs TTL auto white balance (AWB) processing according to the obtained calculation result.

The memory control circuit 22 controls the A/D converter 16, the timing generation circuit 18, the image processing circuit 20, the image display memory 24, the D/A converter 26, the memory 30, and the compression/expansion circuit 32.

The data supplied from the A/D converter 16 is written to the image display memory 24 or the memory 30 through the image processing circuit 20 and the memory control circuit 22 or through the memory control circuit 22.

The image display unit 28 is formed of a thin-film transistor (TFT) liquid crystal display (LCD) or the like. Display image data written in the image display memory 24 is displayed on the image display unit 28 through the D/A converter 26.

By sequentially displaying the captured image data using the image display unit 28, an electronic viewfinder function can be realized.

The display on the image display unit 28 is arbitrarily turned on or off by an instruction given from the system control circuit 50. If the display is turned off, the power consumption of the image pickup apparatus 100 can be considerably reduced.

The memory 30 stores captured still images or moving images. The memory 30 has a storage capacity sufficient to store a predetermined number of still images or moving images having a predetermined time period. Therefore, even in a continuous shooting mode for continuously shooting a plurality of still images or a panorama shooting mode, a large volume of images can be written to the memory 30 at a high speed. The memory 30 can also be used as a work area for the system control circuit 50.

The compression/expansion circuit 32 compresses and expands image data using a technique such as an adaptive discrete cosine transform (ADCT) or wavelet transform technique. The compression/expansion circuit 32 reads an image stored in the memory 30 for compression or expansion, and writes the resulting data to the memory 30.

The encryption/decryption circuit 34 performs encryption processing, if necessary, on the captured image data that is stored in a predetermined region of the memory 30, and performs decryption processing when encrypted image data stored in a predetermined region of the memory 30 is reproduced and displayed.

The image pickup apparatus 100 further includes the exposure controller 40, the distance measurement controller 42, a zoom controller 44, a barrier controller 46, and a flash 48. The exposure controller 40 controls the shutter 12 having the aperture function, and operates with the flash 48 to achieve a flash light control function. The distance measurement controller 42 controls the focusing of the lens 10, and the zoom controller 44 controls the zooming of the lens 10. The barrier controller 46 controls the operation of a protecting unit 102 serving as a barrier. The flash 48 has an AF auxiliary light projecting function and a flash light control function.

The exposure controller 40 and the distance measurement controller 42 are controlled using the TTL method. The system control circuit 50 controls the exposure controller 40 and the distance measurement controller 42 according to a calculation result that is obtained by processing the captured image data using the image processing circuit 20. The system control circuit 50 controls the operation of the image pickup apparatus 100.

The image pickup apparatus 100 further includes a memory 52, a display unit 54, and a non-volatile memory 56. The memory 52 stores constants, variables, programs, etc., for operating the system control circuit 50.

The display unit 54 is a display unit used in a liquid crystal display device, a speaker, or the like for displaying operation states, messages, etc., using characters, images, sound, and the like in accordance with the execution of the program by the system control circuit 50. One or a plurality of display units 54 are disposed at an easily observable position or positions in the vicinity of an operation unit 70 of the image pickup apparatus 100, and are formed by a combination of, for example, an LCD, an LED, and a sound generating element.

Some of the functions of the display unit 54 are provided in an optical viewfinder 104. Among indications displayed on the display unit 54, examples of indications displayed on the LCD or the like include indications of shooting information, indications of image quality information, and indications of other information. The indications of shooting information include a single-shot/continuous shooting indication, a self-timer indication, a compression ratio indication, an indication of the number of recording pixels, an indication of the number of recorded images, and an indication of the remaining number of images that can be captured. The indications of image quality information include a shutter speed indication, an aperture value indication, an exposure correction indication, a flash indication, a red-eye-effect-reduction indication, and a macro-shooting indication. The indications of other information include a buzzer setting indication, an indication of the remaining clock battery level, an indication of the remaining battery level, an error indication, an information indication using a number having a plurality of digits, an indication of the attachment or detachment of a recording medium 200, a communication interface (I/F) operation indication, a date and time indication, and an indication of the connection state with an external computer.

Among the indications displayed by the display unit 54, in the optical viewfinder 104, are an in-focus indication, an indication of a ready-for-shooting state, a shake warning indication, a flash charge indication, a flash charge completion indication, a shutter speed indication, an aperture value indication, an exposure correction indication, and a recording-medium write access indication.

Among the indications displayed by the display unit 54 on the LED or the like are an in-focus indication, an indication of a ready-for-shooting state, a shake warning indication, a flash charge indication, a flash charge completion indication, a recording-medium write access indication, an indication of macro-shooting setup notification, and a secondary battery charging state indication.

Among the indications displayed by the display unit 54 using a lamp or the like is a self-timer indication lamp. The self-timer indication lamp may also be used together with AF auxiliary light.

The display unit 54 may include one or a plurality of display monitors including an external display monitor, such as a rear liquid crystal panel 1201, and an internal display monitor, such as a viewfinder 1202, as discussed below. The rear liquid crystal panel 1201 may be provided with a rotatable operating member that allows a user to view an object from different angles.

The non-volatile memory 56 is an electrically erasable and recordable memory, such as an electrically erasable programmable read-only memory (EEPROM) or a flash memory.

The image pickup apparatus 100 further includes a power supply switch (main switch) 60, first and second shutter switches (SW1 and SW2) 62 and 64, an operation unit 70, a mode dial switch 72, and a vertical position detection sensor 75. Those operating units will be described in detail.

The power supply switch 60 allows switching between power-on and power-off modes of the image pickup apparatus 100. The power supply switch 60 further allows switching between power-on and power-off operations of various accessories connected to the image pickup apparatus 100.

The first shutter switch (SW1) 62 is turned on in the middle of the operation of a shutter button (not shown) to give an instruction to start operations such as auto focus (AF) processing, auto exposure (AE) processing, auto white balance (AWB) processing, and electronic flash pre-emission (EF) processing.

The second shutter switch (SW2) 64 is turned on at completion of the operation of the shutter button (not shown) to give an instruction to start a series of operations including exposure processing, developing processing, and recording processing. In the exposure processing, based on a signal read from the image pickup device 14, image data is written to the memory 30 through the A/D converter 16 and the memory control circuit 22. The developing processing is performed by the calculation performed by the image processing circuit 20 and the memory control circuit 22. Then, in the recording processing, the image data is read from the memory 30 and compressed by the compression/expansion circuit 32, and the resulting data is written to the recording medium 200.

The operation unit 70 includes various buttons and a touch panel. For example, the operation unit 70 includes setting buttons such as a menu button, a set button, a macro button, a multi-screen reproduction page-turning button, a flash setting button, and a single shooting/continuous shooting/self-timer switching button. The operation unit 70 further includes operation buttons such as a menu move plus (+) button, a menu move minus (−) button, a reproduction-image move plus (+) button, a reproduction-image move minus (−) button, and a shooting quality selection button. The operation unit 70 further includes an exposure correction button, a date and time setting button, an image display ON/OFF button, a compression mode switch, and a quick review switch for setting a quick review function that allows automatic reproduction and display of captured image data using the image display unit 28 immediately after the shooting. The operation unit 70 further includes a selection/changeover switch for switching between selection and changeover of various functions during shooting and/or reproduction and/or communication, and a setup/execution switch for switching between setup and execution of the various functions during shooting and/or reproduction and/or communication.

Figure 2A:
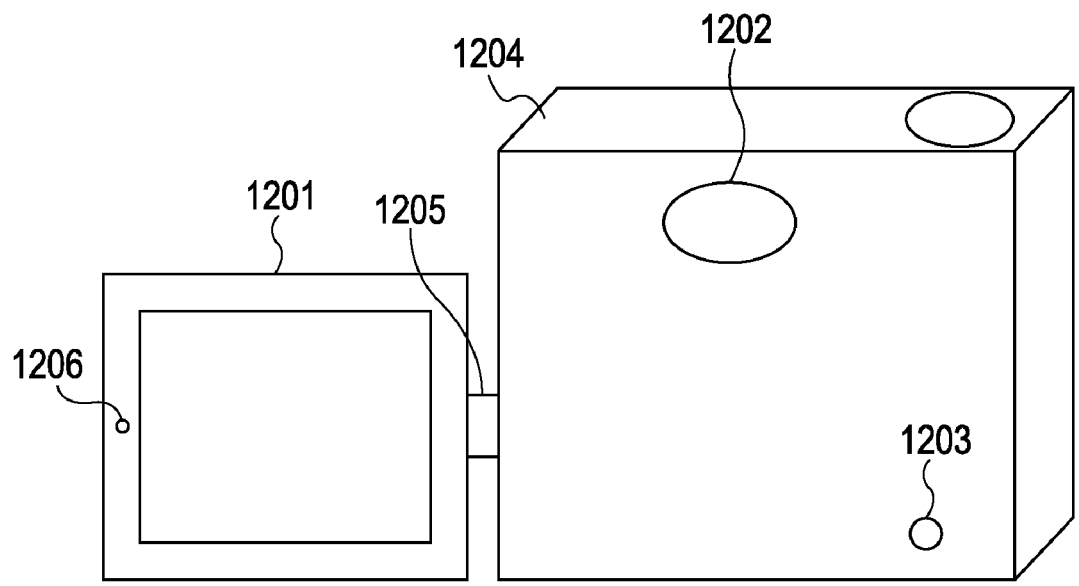
FIGS. 2A and 2B are rear views illustrating opening and closing states of a vari-angle LCD of an image pickup apparatus according to a first embodiment of the present invention, respectively.

As illustrated in FIG. 2A, the display unit 54 is provided with the rear liquid crystal panel 1201 and the viewfinder 1202. Each of the rear liquid crystal panel 1201 and the viewfinder 1202 provides the setting of display/non-display of shooting information, display/non-display of a histogram, and display/non-display of grid lines. The display monitors and the settings are changed using a DISP button 1203.

The compression mode switch is a switch for selecting a compression ratio of JPEG (Joint Photographic Expert Group) compression or a CCD RAW mode for directly converting a signal from the image pickup device 14 into a digital signal and recording it onto a recording medium. For example, a normal mode and a fine mode are prepared as JPEG compression modes.

The user of the image pickup apparatus 100 can select the normal mode or the fine mode to perform shooting. The user may select the normal mode when the user places more importance on the data size of captured images, whereas the user may select the fine mode when the user places more importance on the quality of captured images.

In the JPEG compression mode, the image data read from the image pickup device 14 and written to the memory 30 through the A/D converter 16, the image processing circuit 20, and the memory control circuit 22 is read. The read image data is compressed at the set compression ratio by the compression/expansion circuit 32, and is encrypted by the encryption/decryption circuit 34, if necessary. The resulting data is recorded on the recording medium 200.

In the CCD RAW mode, image data is directly read on a line-by-line basis according to the arrangement of pixels of color filters of the image pickup device 14. The image data written to the memory 30 through the A/D converter 16 and the memory control circuit 22 is read, and is then encrypted by the encryption/decryption circuit 34, if necessary. The resulting data is recorded on the recording medium 200.

Now referring back to FIG. 1, the mode dial switch 72 allows switching of function modes such as an automatic shooting mode, a shooting mode, a panorama shooting mode, a reproduction mode, a multi-screen reproduction/deletion mode, and a PC connection mode.

The vertical position detection sensor 75 determines whether the image pickup apparatus 100 is positioned vertically or horizontally.

The image pickup apparatus 100 further includes a power supply controller 80, connectors 82 and 84, and a power supply unit 86.

The power supply controller 80 includes a battery detection circuit, a DC-DC converter, and a switching circuit for switching a block to be energized. The power supply controller 80 determines whether or not a battery is installed, the type of the battery, and the remaining battery level, and controls the DC-DC converter according to the detection results and an instruction given from the system control circuit 50 to supply a required voltage to the respective components including the recording medium 200 for a required period of time.

The power supply unit 86 includes a primary battery, such as an alkaline battery or a lithium battery, a secondary battery, such as a NiCd battery, a NiMH battery, or a Li-ion battery, and an AC adapter.

The image pickup apparatus 100 further includes an interface 90, a connector 92, a video output terminal 93, the protecting unit 102, the optical viewfinder 104, communication units 110 and 114, and antennas (or connectors) 112 and 116.

The interface 90 interfaces with the recording medium 200 such as a memory card or a hard disk. The connector 92 is connected to the recording medium 200 such as a memory card or a hard disk.

The video output terminal 93 is a terminal for connecting to a display of a television set or the like.

The protecting unit 102 serves as a barrier that covers an image-capturing unit including the lens 10 of the image pickup apparatus 100 to prevent contamination or damage to the image-capturing unit.

The optical viewfinder 104 allows shooting without using the electronic viewfinder function realized by the image display unit 28. Some of the functions of the display unit 54 are provided in the optical viewfinder 104, such as the in-focus indication, the shake warning indication, the flash charge indication, the shutter speed indication, the aperture value indication, and the exposure correction indication.

The communication unit 110 has a mobile phone communication function supporting standards such as TDMA (Time Division Multiple Access), CDMA (Code Division Multiple Access), W-CDMA (Wideband Code Division Multiple Access), and PHS (Personal Handyphone System).

The antenna (or connector) 112 establishes a connection between the image pickup apparatus 100 and an image information management apparatus (image gateway) using the communication unit 110 via a packet network and a network. Further, the antenna 112 serves as an antenna, or in the case of wired communication, a connector, for establishing a connection with another apparatus via a network or the Internet.

The communication unit 114 has a wireless communication function based on protocols such as Bluetooth. The communication unit 114 may also have functions for performing various types of communication such as wired communication based on RS232C, universal serial bus (USB), IEEE (Institute of Electrical and Electronics Engineers) 1394, P1284, SCSI (Small Computer System Interface), modem, local area network (LAN), and the like, infrared communication based on IrDA (Infrared Data Association) and the like, and optical communication.

The antenna (or connector) 116 serves as an antenna, or in case of wired communication, a connector, for connecting the image pickup apparatus 100 to another apparatus, such as a printing apparatus (printing service), using the communication unit 114.

The recording medium 200 is formed of a memory card, a hard disk, or the like. The recording medium 200 includes a recording unit 202 formed of a semiconductor memory, a magnetic disk, or the like, an interface 204 interfacing with the image pickup apparatus 100, and a connector 206 for establishing a connection with the image pickup apparatus 100. In the first embodiment, the recording medium 200 is built in the image pickup apparatus 100.

Figure 2B:
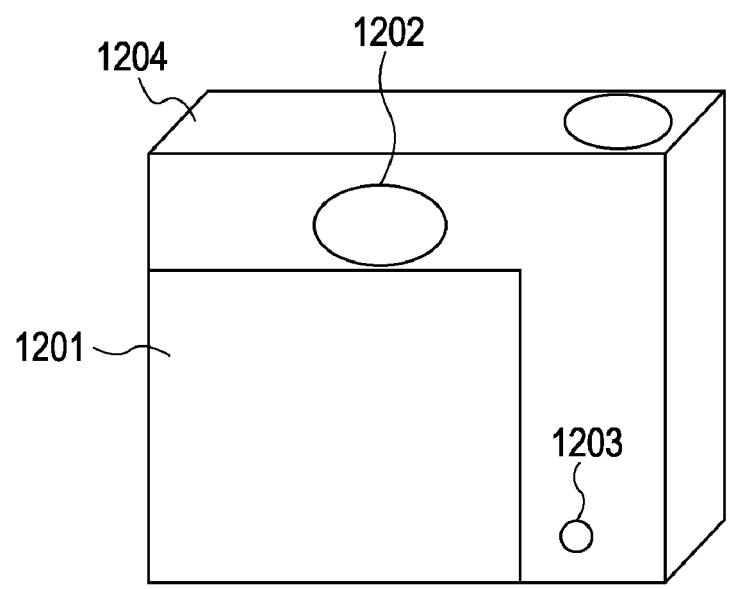

FIGS. 2A and 2B are external views of the image pickup apparatus 100. Referring to FIG. 2A, the image pickup apparatus 100 is provided with the rear liquid crystal panel 1201 and the viewfinder 1202. The DISP button 1203 allows switching of the display.

The viewfinder 1202 is fixed to an image-capturing unit 1204 including the lens 10 and the image pickup device 14. The rear liquid crystal panel 1201 is connected to the image-capturing unit 1204 through a connection unit 1205. The connection unit 1205 is a rotatable operating member that allows a user to operate the rear liquid crystal panel 1201 at different angles. FIG. 2B illustrates a closing state of the rear liquid crystal panel 1201 in which the rear liquid crystal panel 1201 is moved so as to face the image-capturing unit 1204 and is received in the image-capturing unit 1204.

The rear liquid crystal panel 1201 has a switch 1206. When the rear liquid crystal panel 1201 is received in the image-capturing unit 1204, as illustrated in FIG. 2B, the image-capturing unit 1204 allows the switch 1206 to be pressed, and the switch 1206 is turned on. Thus, the ON/OFF state of the switch 1206 is detected to determine whether or not the rear liquid crystal panel 1201 is received in the image-capturing unit 1204.

[Operation of Image Pickup Apparatus 100]

Figure 3:
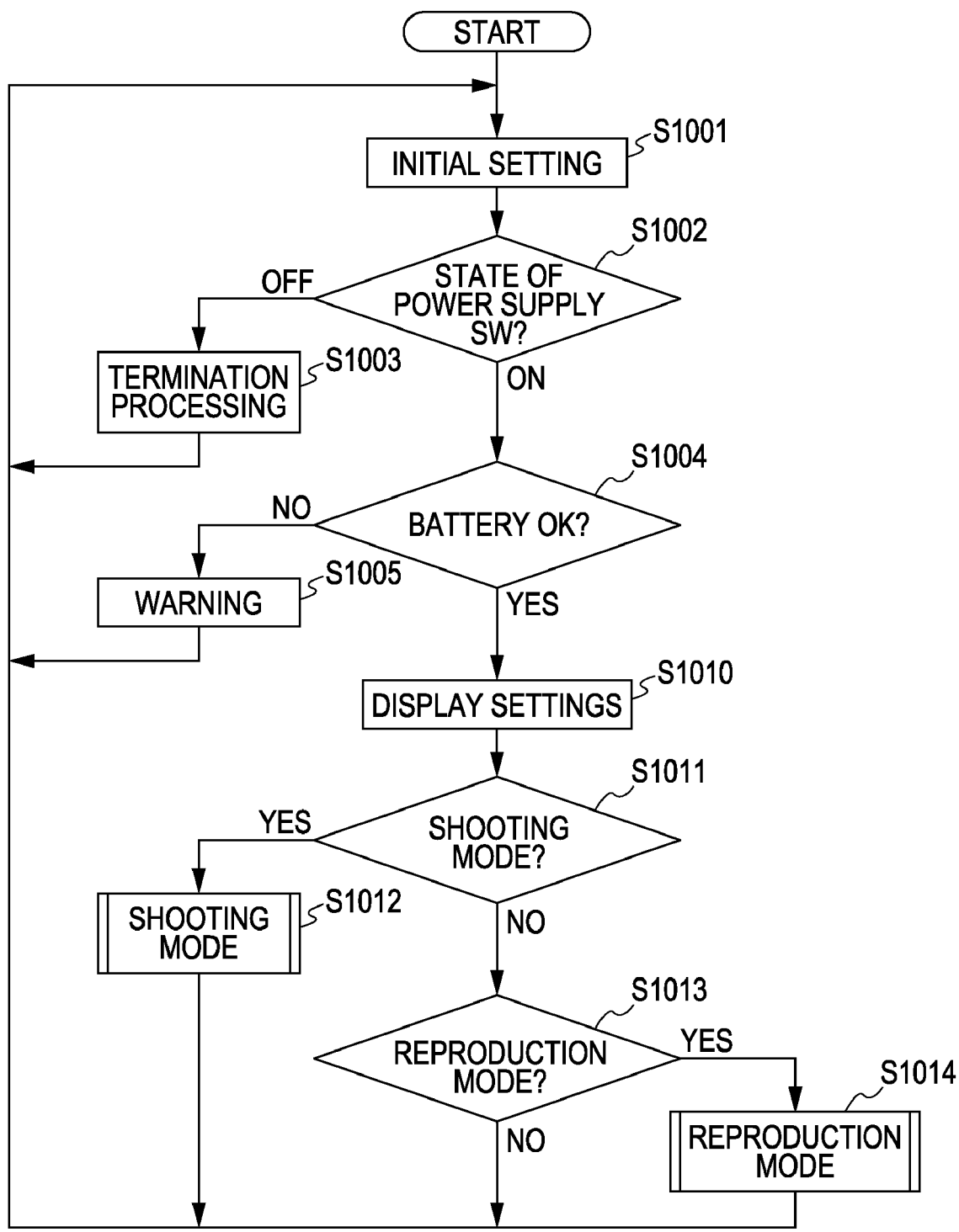
FIG. 3 is a flowchart illustrating a main routine of the image pickup apparatus according to the first embodiment.

FIG. 3 is a flowchart illustrating a main routine of the image pickup apparatus 100 according to the first embodiment.

The operation of the image pickup apparatus 100 will be described with reference to FIG. 3. By turning on the power when, for example, a battery is replaced, the system control circuit 50 initializes parameters such a flag and a control variable, and sets the respective components of the image pickup apparatus 100 in an initial state (step S1001). The system control circuit 50 determines the setting position of the power supply switch 60 (step S1002). If the power supply switch 60 is set to the power-off mode (OFF in step S1002), the indications displayed on the display unit 54 are changed to a termination state. Then, necessary parameters, such as the flag and the control variable, setting values, and setting modes are recorded in the non-volatile memory 56. After the power supply controller 80 performs predetermined termination processing such as interrupting unnecessary power supply to the components of the image pickup apparatus 100 including the image display unit 28 (step S1003), the process returns to step S1002.

If it is determined in step S1002 that the power supply switch 60 is set to the power-on mode, the process proceeds to step S1004.

The system control circuit 50 checks the remaining capacity or the operation state of the power supply unit 86 formed of a battery or the like using the power supply controller 80, and determines whether a problem is caused in the operation of the image pickup apparatus 100 (step S1004). If a problem is caused, a predetermined visual or audio warning is given using the display unit 54 and/or the image display unit 28 (step S1005). Then, the process returns to step S1002.

If it is determined in step S1004 that the power supply unit 86 has no problem, the process proceeds to step S1010.

The system control circuit 50 performs visual or audio display of various setting states of the image pickup apparatus 100 using the display unit 54. If the display on the image display unit 28 is turned on, the image display unit 28 is also used to perform the visual or audio display of the various setting states of the image pickup apparatus 100 (step S1010).

Next, the system control circuit 50 determines the setting position of the mode dial switch 72 (step S1011). If the mode dial switch 72 is not set in a shooting mode, the process proceeds to step S1013.

If it is determined in step S1011 that the mode dial switch 72 is set in the shooting mode, the system control circuit 50 performs shooting mode processing (step S1012). After the processing has been completed, the process returns to step S1002.

The system control circuit 50 further determines the setting position of the mode dial switch 72 (step S1013). If the mode dial switch 72 is not set in a reproduction mode, the process proceeds to step S1002.

If it is determined in step S1013 that the mode dial switch 72 is set in the reproduction mode, the system control circuit 50 performs reproduction processing for displaying substantial image data of the captured image data (step S1014). After the processing has been completed, the process returns to step S1002.

The user of the image pickup apparatus 100 can therefore perform shooting and reproduction, as desired, using the image pickup apparatus 100.

[Exemplary Menu Screen]

A menu screen of the first embodiment of the present invention will be described with reference to FIGS. 4 to 13C.

Figure 4:
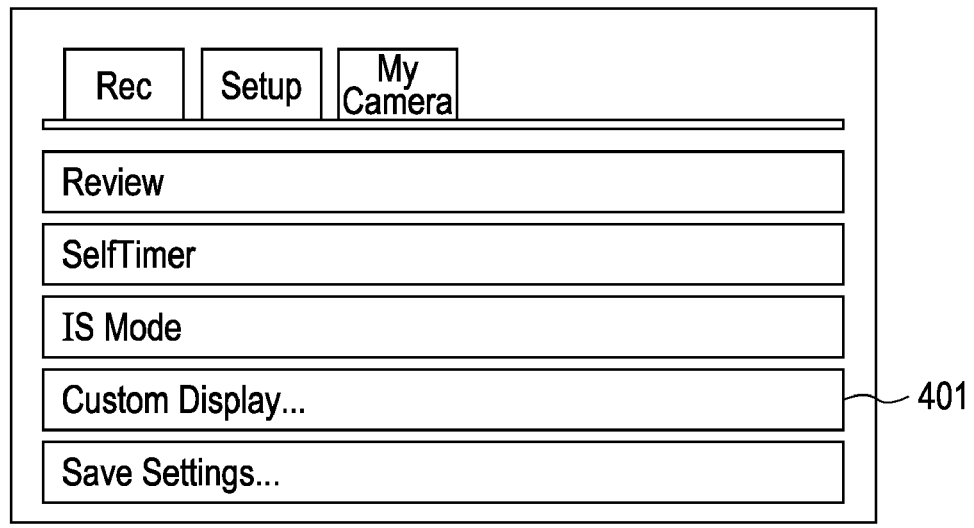
FIG. 4 is a diagram illustrating a shooting menu according to the first embodiment.

When the user presses a menu button in the shooting mode, a menu screen illustrated in FIG. 4 is displayed. The user operates the operation unit 70 to select a "Custom Display . . ." item 401, thereby displaying a display setting menu illustrated in FIG. 5.

In the first embodiment, four display modes are prepared: a first setting mode 501 of the rear liquid crystal panel 1201 (hereinafter referred to as "EVF mode 1"), a second setting mode 502 of the rear liquid crystal panel 1201 (hereinafter referred to as "EVF mode 2"), a first setting mode 503 of the viewfinder 1202 (hereinafter referred to as "CVF mode 1"), and a second setting mode 504 of the viewfinder 1202 (hereinafter referred to as "CVF mode 2"). A shooting information indication 505, a grid lines indication 506, and a histogram indication 507 are illustrated. A user can arbitrarily enable or disable the indication items in any of the display modes. A function that is enabled is displayed with a tick mark. For example, a tick mark 508 indicates that the shooting information is displayed in the EVF mode 1.

Specifically, upon receiving an operation for enabling or disabling the indication items from the user through the operation unit 70, the system control circuit 50 stores the enabled or disabled settings in the non-volatile memory 56. For screen display, the system control circuit 50 reads the stored settings, and controls the display according to the read settings.

The user can further enable or disable the display modes by operating the operation unit 70. For example, the mode 503 is marked with an icon for disabling a display mode, resulting in no screen transition to this display mode. That is, each time the user presses the DISP button 1203, the display mode is sequentially changed to the display modes that are not disabled. FIG. 6 illustrates assignment of icons in accordance with the enabling and disabling of the display modes. It is to be noted that the current display mode is not disabled.

Each display monitor provides the setting of display/non-display of information, display/non-display of grid lines, display/non-display of a histogram, and display/non-display of print guide. An item that has been set but is not enabled is displayed with a gray-out pattern.

Screen transitions in the shooting mode processing (step S1012) according to the setting of the display modes will be described.

FIG. 7 illustrates an example of the display setting menu. FIGS. 8A to 8E illustrate screens displayed according to the settings illustrated in FIG. 7.

Figure 8A:
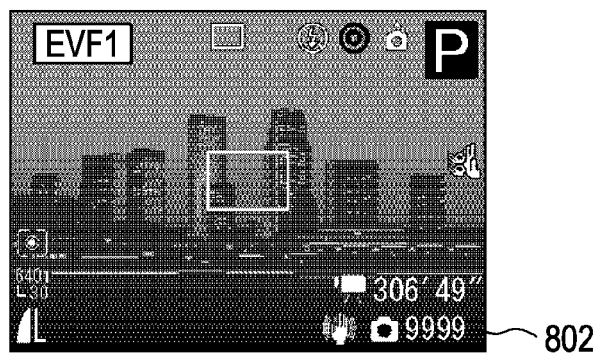
FIGS. 8A to 8D are diagrams illustrating an example of screen transitions performed by a button operation according to the first embodiment.

FIG. 8A illustrates a screen displayed in the EVF mode 1. In the EVF mode 1, the image is displayed on the rear liquid crystal panel 1201. An indication of the current mode, namely, the EVF mode 1, is displayed at an upper left position of the image. In FIG. 7, since the shooting information indication is enabled in the EVF mode 1 (501), shooting information 802 is displayed.

Figure 8B:
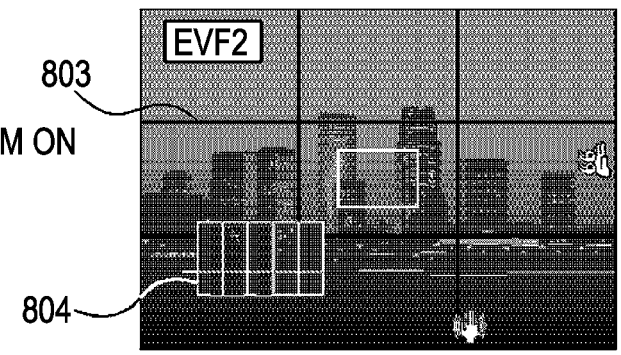
Figure 8C:
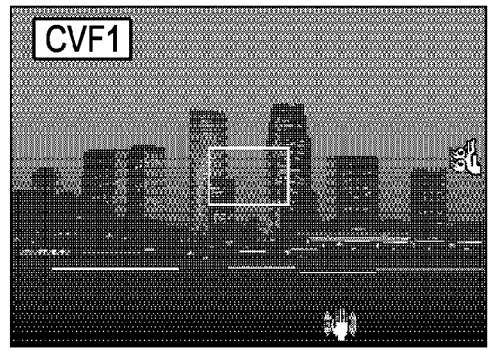

When the user presses the DISP button 1203 in the state where the screen illustrated in FIG. 8A is displayed, the display mode is changed to the EVF mode 2, and a screen illustrated in FIG. 8B is displayed on the rear liquid crystal panel 1201. In FIG. 7, since the grid line indication and the histogram indication are enabled in the EVF mode 2 (502), grid lines 803 and a histogram 804 are displayed on the screen. FIG. 8E illustrates an example of the histogram 804.

When the user presses the DISP button 1203 in the state illustrated in FIG. 8B, the display mode is changed to the CVF mode 1, and an image is displayed on the viewfinder 1202. In the CVF mode 1, a screen illustrated in FIG. 8C is displayed. In FIG. 7, all the items are disabled in the CVF mode 1 (503). Therefore, none of the shooting information indication, the grid lines indication, and the histogram indication is displayed on the screen.

Figure 8D:
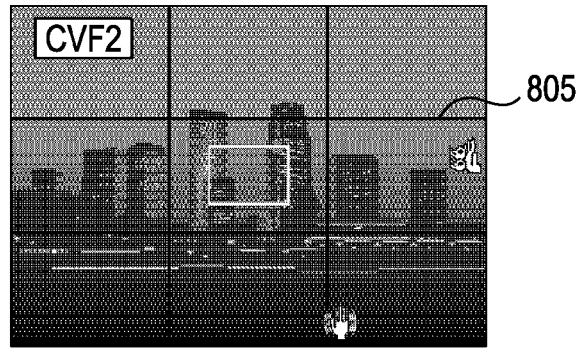
Figure 8E:
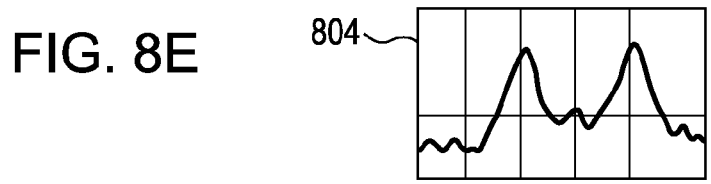
FIG. 8E is a diagram illustrating an example histogram.

When the user presses the DISP button 1203 in the state illustrated in FIG. 8C, the display mode is changed to the CVF mode 2, and a screen illustrated in FIG. 8D is displayed on the viewfinder 1202. In FIG. 7, since the grid lines indication is enabled in the CVF mode 2 (504), grid lines 805 are displayed on the screen.

When the user presses the DISP button 1203 in the state illustrated in FIG. 8D, the display mode is changed to the EVF mode 1, and the screen illustrated in FIG. 8A is displayed on the rear liquid crystal panel 1201.

In this manner, a plurality of display modes are cyclically changed in accordance with the depression of the DISP button 1203 by the user. An indication item that is set in advance by the user is displayed according to each of the display modes.

Figure 9:
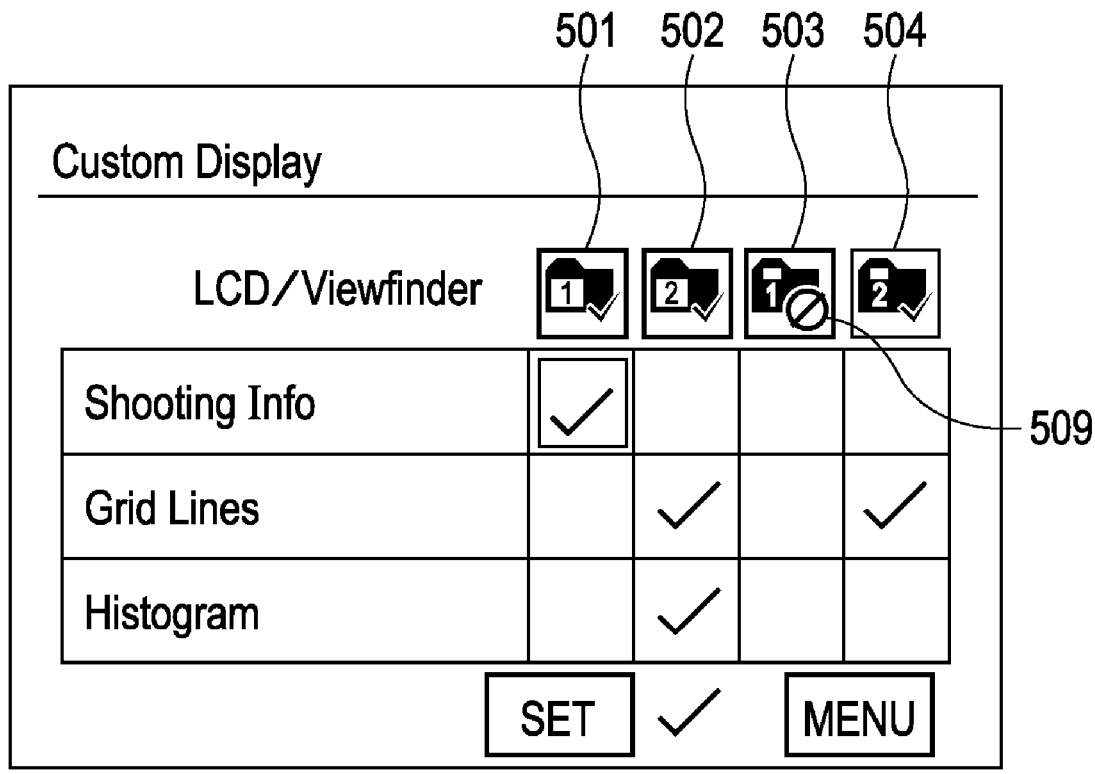
FIG. 9 is a diagram illustrating a display setting screen according to the first embodiment.

Screen transitions in a case where some of the display modes are disabled will be described with reference to FIGS. 9 to 10C. In FIG. 9, the settings of the indication items for each of the display modes are similar to those illustrated in FIG. 7, although the CVF mode 1 (503) is disabled. The CVF mode 1 (503) that is disabled is marked with an icon 509 indicating a disabling setting.

Figure 10A:
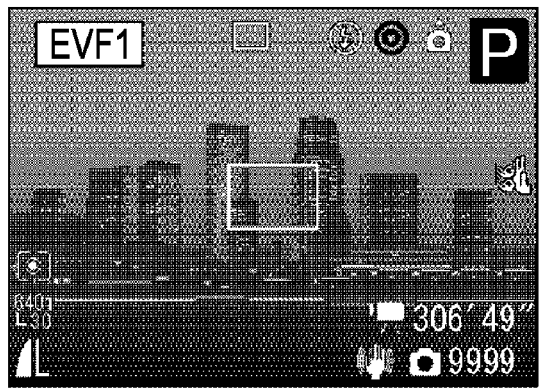
FIGS. 10A to 10C are diagrams illustrating an example of screen transitions performed by a button operation according to the first embodiment.

FIG. 10A illustrates a screen displayed in the EVF mode 1. When the user presses the DISP button 1203 in the state in which the screen illustrated in FIG. 10A is displayed, the display mode is changed to the EVF mode 2, and a screen illustrated in FIG. 10B is displayed on the rear liquid crystal panel 1201.

Figure 10B:
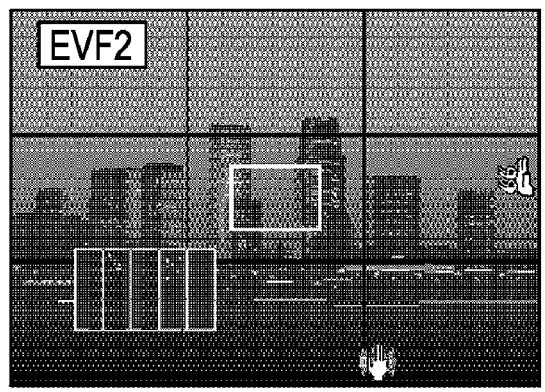
Figure 10C:
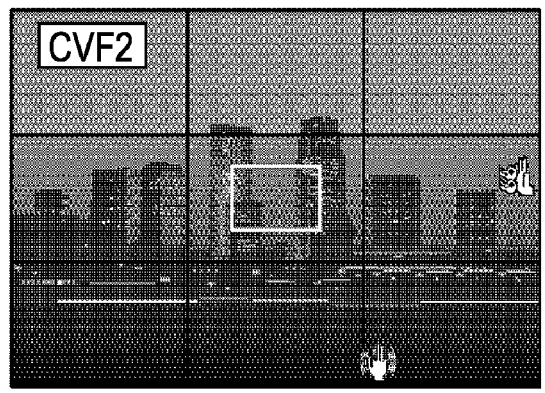

When the user presses the DISP button 1203 in the state illustrated in FIG. 10B, the display mode is changed to the CVF mode 2 because the CVF mode 1 (503) is disabled, and a screen illustrated in FIG. 10C is displayed on the viewfinder 1202.

Screen transitions in a case where only one display monitor is enabled will be described with reference to FIGS. 12A to 12C.

Screens displayed in a case where only one of the display modes is enabled will be described with reference to FIGS. 11 to 12C. Only the EVF mode 1 (501) is enabled on a display setting screen illustrated in FIG. 11.

Figure 12A:
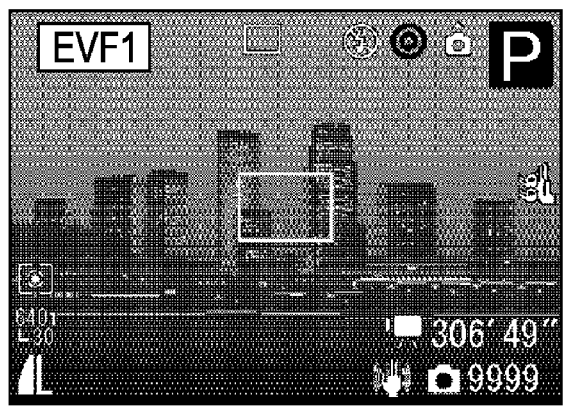
FIGS. 12A to 12C are diagrams illustrating example dialog boxes that prompt a user to change the display according to the first embodiment.

First, a screen illustrated in FIG. 12A is displayed. Even if the user presses the DISP button 1203 in the state in which the screen illustrated in FIG. 12A is displayed, the display mode is not changed because the other display modes are disabled. If the DISP button 1203 is pressed when only one of the display modes is enabled, a screen illustrated in FIG. 12B is displayed. In this case, a dialog box 1501 that prompts the user to change the settings of the display modes is displayed on the screen. The dialog box 1501 allows the user to perceive that the enabling/disabling setting of the display modes should be changed.

Figure 12B:
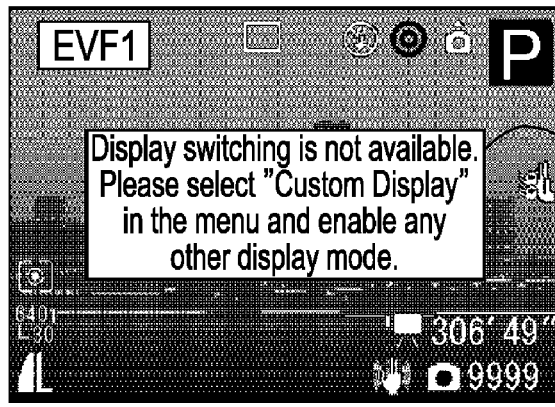
Figure 12C:
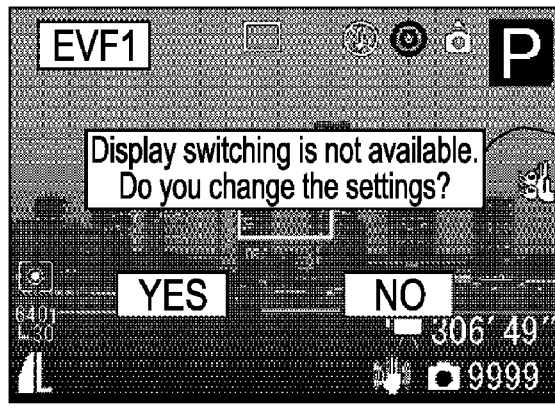

As an alternative of the screen illustrated in FIG. 12B, a screen illustrated in FIG. 12C may be displayed. When the user selects "YES" on this screen in response to a dialog box 1502, the screen is changed to the display setting screen illustrated in FIG. 11 according to the operation given by the user so that the display setting can be immediately changed.

In the display mode changing operation, the change from which mode to which mode may be displayed. This display will be described hereinafter.

Figure 13A:
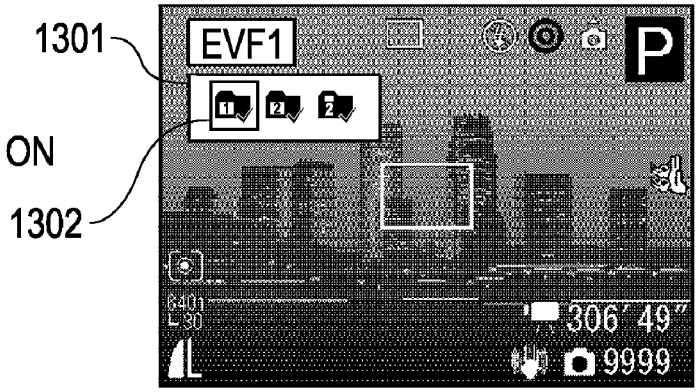
FIGS. 13A to 13C are diagrams illustrating example icons displayed during screen transitions according to the first embodiment.
Figure 13B:
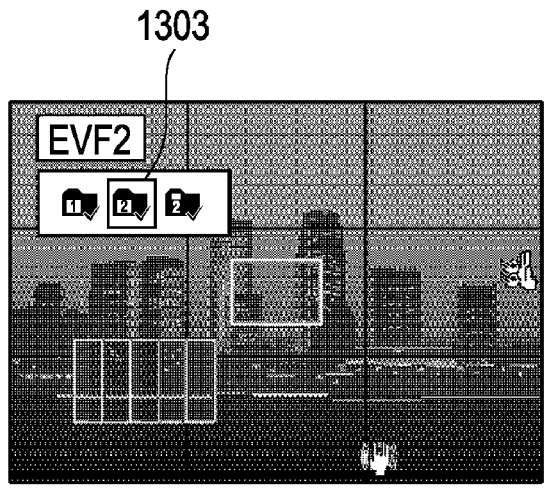
Figure 13C:
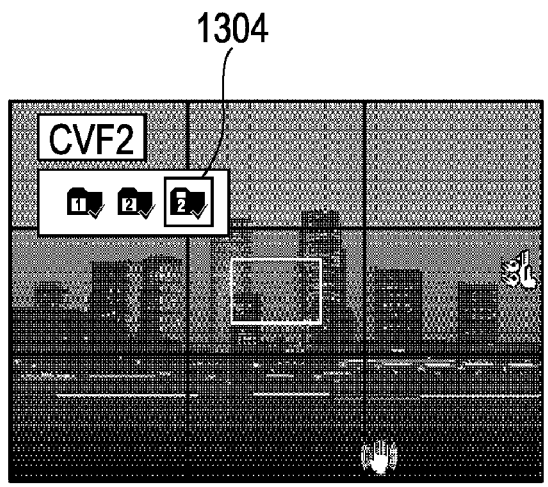

FIGS. 13A to 13C illustrate screens to be displayed by changing the display modes in the settings illustrated in FIG. 9. First, the screen illustrated in FIG. 13A is displayed. This screen includes a mode change icon 1301 indicating changing modes. In the mode change icon 1301, icons indicating the display modes that are currently enabled are displayed. In FIGS. 13A to 13C, icons indicating three enabled display modes, i.e., the EVF mode 1, the EVF mode 2, and the CVF mode 2, are displayed.

Among the displayed three icons, an icon indicating the current display mode is surrounded by a rectangle so as to be visually identified from the other display modes. Since the screen illustrated in FIG. 13A is a screen displayed in the EVF mode 1, an icon 1302 representing the EVF mode 1 is displayed in a highlighted manner.

On a screen for the EVF mode 2 illustrated in FIG. 13B, an icon 1303 representing the EVF mode 2 is displayed so as to be identified from the other icons. On a screen for the CVF mode 2 illustrated in FIG. 13C, an icon 1304 representing the CVF mode 2 is displayed so as to be identified from the other icons.

The mode change icon 1301 allows the user to understand in which mode the display is currently being performed or to predict to which display mode the current display mode is to be changed when the user presses the DISP button 1203.

The mode change icon 1301 is not limited to that illustrated in FIGS. 13A to 13C. For example, only the current display mode and the next display mode to which the current display mode is to be changed may be displayed. Alternatively, an icon representing a display mode that is disabled may be displayed in a hidden fashion.

Figure 14:
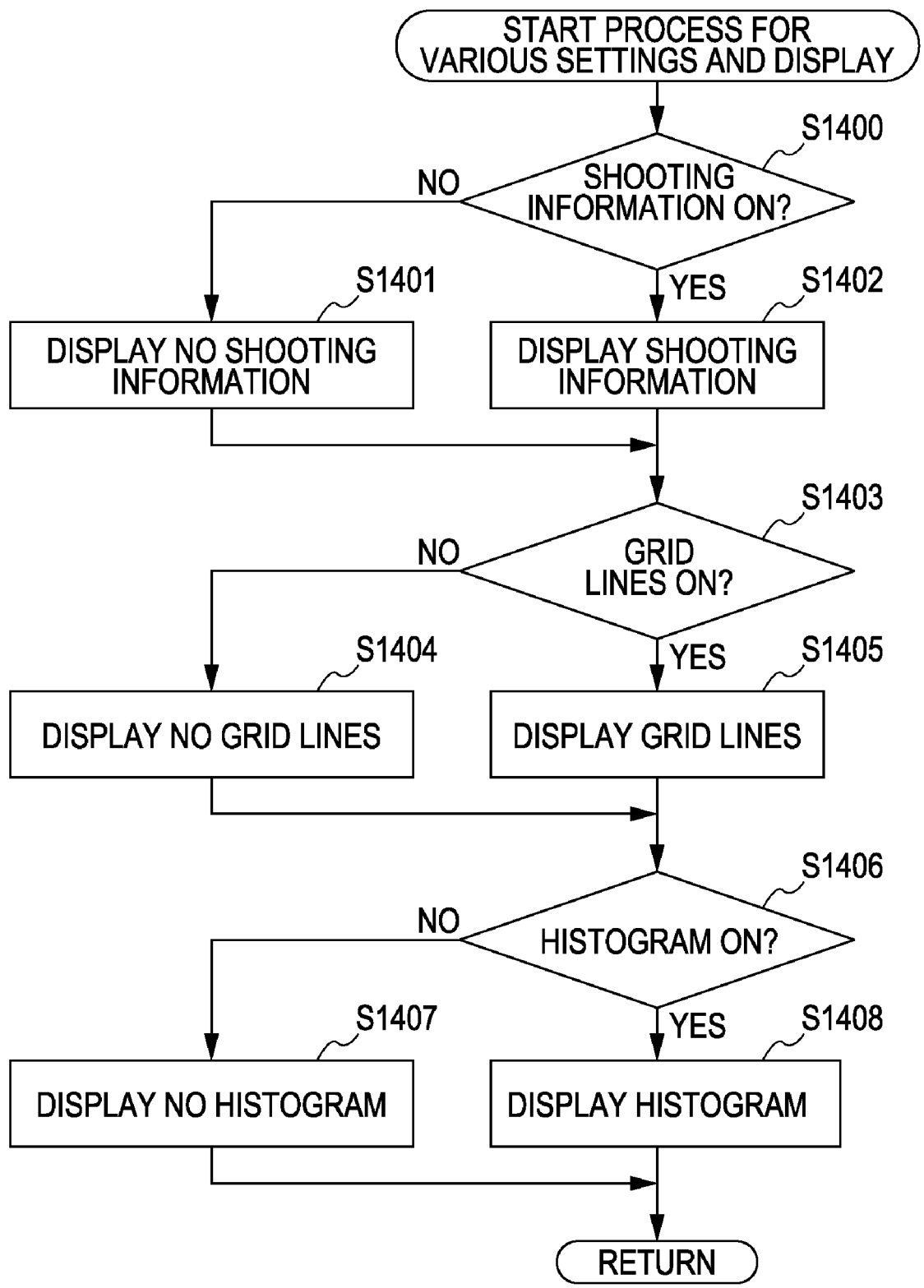
FIG. 14 is a flowchart illustrating a process for performing various settings and display according to the first embodiment.

FIG. 14 is a flowchart illustrating a screen display process in each of the display modes according to the first embodiment.

Figure 5:
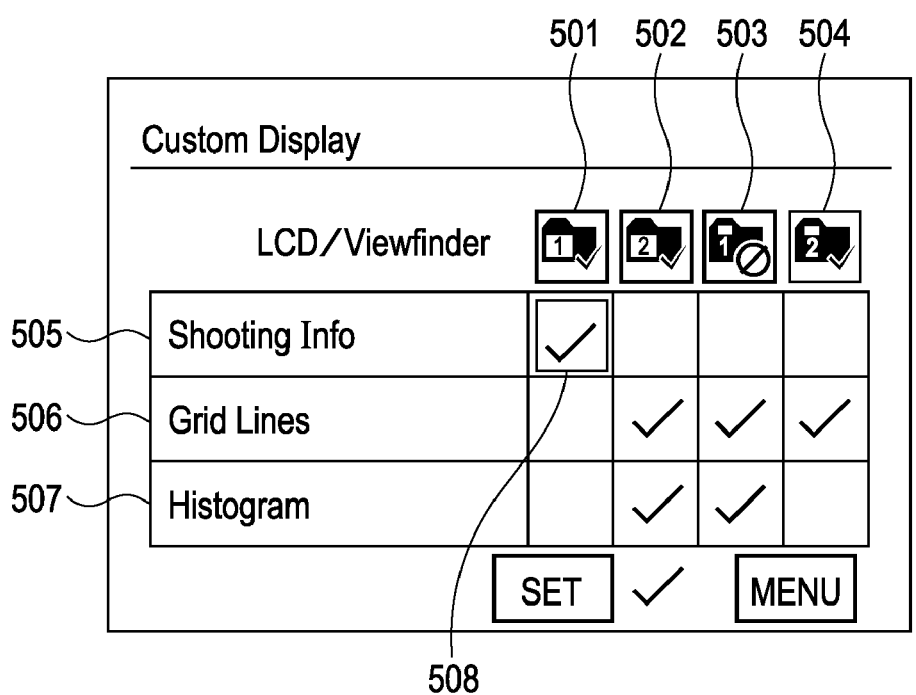
FIG. 5 is a diagram illustrating a display setting screen according to the first embodiment.

First, the system control circuit 50 accesses the non-volatile memory 56 to obtain enabling or disabling of a shooting information display setting on the display setting menu illustrated in FIG. 5 (step S1400).

If the shooting information display setting is enabled, the system control circuit 50 displays shooting information on the display unit 54 according to the display modes (step S1402). If the shooting information display setting is disabled (NO in step S1400), no shooting information is displayed (step S1401).

Then, the system control circuit 50 obtains enabling or disabling of a grid lines display setting (step S1403). If the grid lines display setting is enabled (YES in step S1403), the system control circuit 50 displays grid lines (step S1405). If the grid lines display setting is disabled, no grid lines are displayed (step S1404).

Then, the system control circuit 50 obtains enabling or disabling of a histogram display setting (step S1406). If the histogram display setting is enabled, a histogram is displayed (step S1408). If the histogram display setting is disabled, no histogram is displayed (step S1407).

In the first embodiment, therefore, the user can freely set the indication items on a display-mode-by-display-mode basis.

Furthermore, as illustrated in FIG. 5, a matrix formed of a plurality of indication items and a plurality of display modes is used as a setting screen, thus allowing the user to easily set a desired combination among multiple combinations.

Since the whole interface for performing display settings is contained in one screen, the user can understand the status of the display settings at a glance.

Second Exemplary Embodiment

The first embodiment has been discussed in the context of changing between four display modes including a display mode for the display on the rear liquid crystal panel 1201 and a display mode for the display on the viewfinder 1202.

In a video output mode, a screen is displayed on an external apparatus such as a television set instead of the rear liquid crystal panel 1201 or the viewfinder 1202. A second embodiment of the present invention will be discussed in the context of changing between display modes in consideration of the video output mode.

The term video output mode in the second embodiment means a state where a digital camera is connected with an external apparatus via the video output terminal 93.

The rear liquid crystal panel 1201 has a type in which it is provided with a rotatable operating member that allows a user to operate the rear liquid crystal panel 1201 at different angles (this type of rear liquid crystal panel is hereinafter referred to as a "vari-angle LCD"). As illustrated in FIG. 2B, the vari-angle LCD 1201 can be received in the main body so that the liquid crystal panel can be hidden from the user (the state illustrated in FIG. 2B is hereinafter referred to as a "closing state of the vari-angle LCD").

In the closing state of the vari-angle LCD 1201, even if an EVF mode is enabled, the user is not allowed to view a screen. Therefore, if the vari-angle LCD 1201 is closed and if the display mode is the EVF mode, means for allowing the user to view a screen is needed.

In the second embodiment, the changing between display modes in consideration of the closing state of the vari-angle LCD 1201 will be described.

In the following description of the second embodiment, a description of common elements to those of the first embodiment is omitted, and elements specific to the second embodiment are described in detail.

First, a case where that the display mode is to be changed to an EVF mode in the state where the vari-angle LCD 1201 is closed will be described. For example, in the settings illustrated in FIG. 7, the image illustrated in FIG. 8D is displayed in the CVF mode 2. In this state, the vari-angle LCD 1201 is closed.

When the user presses the DISP button 1203 in the state where the screen illustrated in FIG. 8D is displayed, the display mode is changed to the CVF mode 1, rather than to the EVF mode 1, and the screen illustrated in FIG. 8C is displayed. That is, in the state where the vari-angle LCD 1201 is closed, the display mode is not changed to an EVF mode regardless of enabling or disabling of the EVF mode.

Then, a case where the vari-angle LCD 1201 is closed by the user in the EVF mode is considered. In the case of the display settings illustrated in FIG. 7, the screen illustrated in FIG. 8A is displayed in the EVF mode 1.

It is assumed that the vari-angle LCD 1201 is closed by the user in the state where the screen illustrated in FIG. 8A is displayed. In this case, the screen is displayed on the viewfinder 1202, rather than on the vari-angle LCD 1201. Since the current display mode is not the CVF mode but is the EVF mode 1, the display is performed according to the settings for the EVF mode 1. Thus, the image illustrated in FIG. 8A, rather than the screen illustrated in FIG. 8C or 8D, is displayed on the viewfinder 1202. That is, the screen that is to be displayed on the rear liquid crystal panel 1201 in the EVF mode 1 is displayed on the viewfinder 1202.

The current display mode is the EVF mode 1. Therefore, even if both the CVF mode 1 and the CVF mode 2 are disabled, the screen illustrated in FIG. 8A is displayed on the viewfinder 1202.

If the vari-angle LCD 1201 is opened again in the state where the screen displayed in the EVF mode 1 is displayed on the viewfinder 1202, the screen illustrated in FIG. 8A is displayed on the vari-angle LCD 1201. Then, the screen displayed on the viewfinder 1202 is deleted.

When the video output mode is set, the display is performed in the current display mode regardless of whether or not the vari-angle LCD 1201 is closed. In the video output mode, the screen is displayed on a display (not shown), and the user can view a screen even if the vari-angle LCD 1201 is closed.

The flow of the process according to the second embodiment will be described with reference to flowcharts illustrated in FIGS. 15 and 16.

Figure 15:
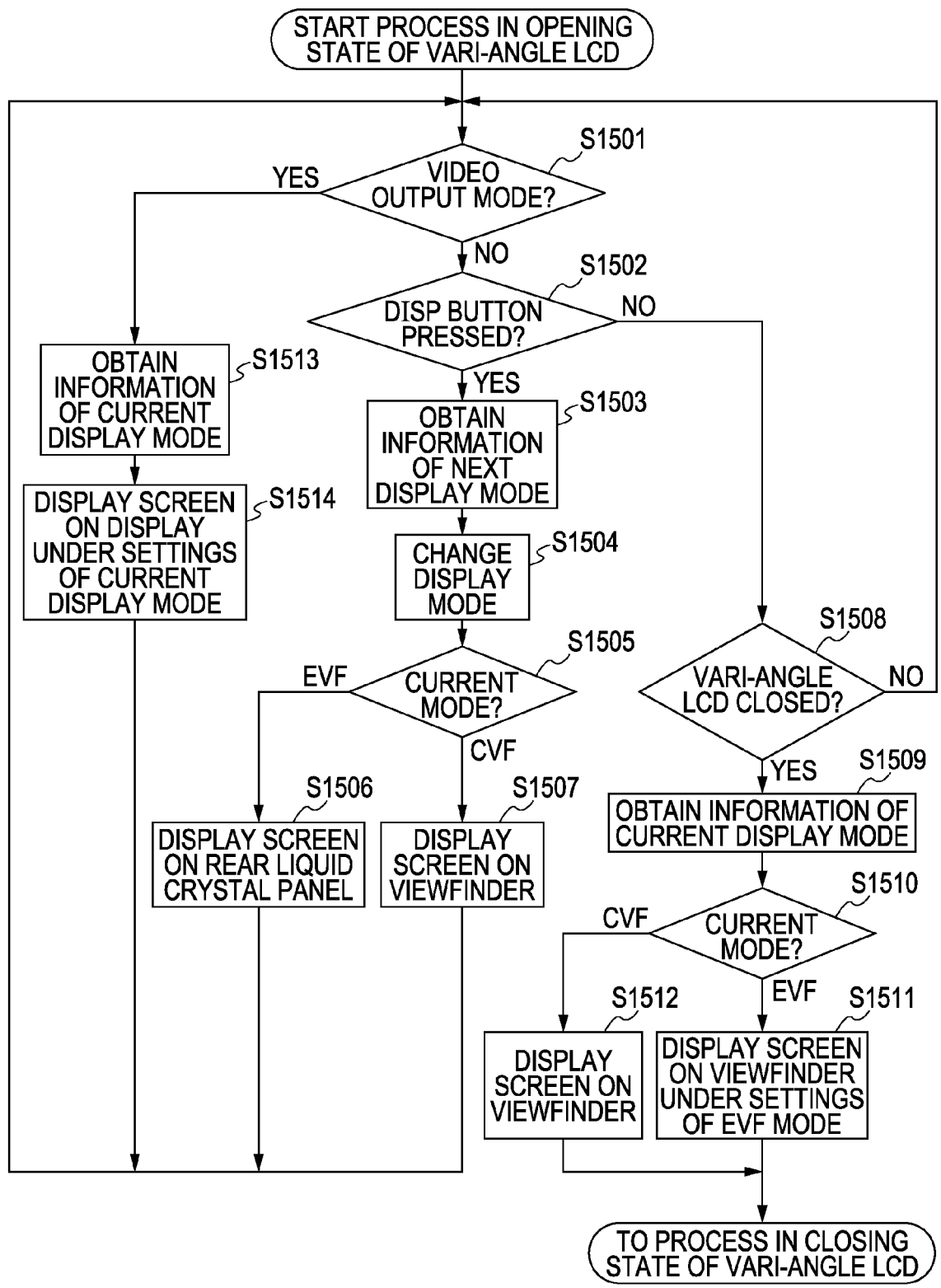
FIG. 15 is a flowchart illustrating a display process according to a second embodiment of the present invention.
Figure 16:
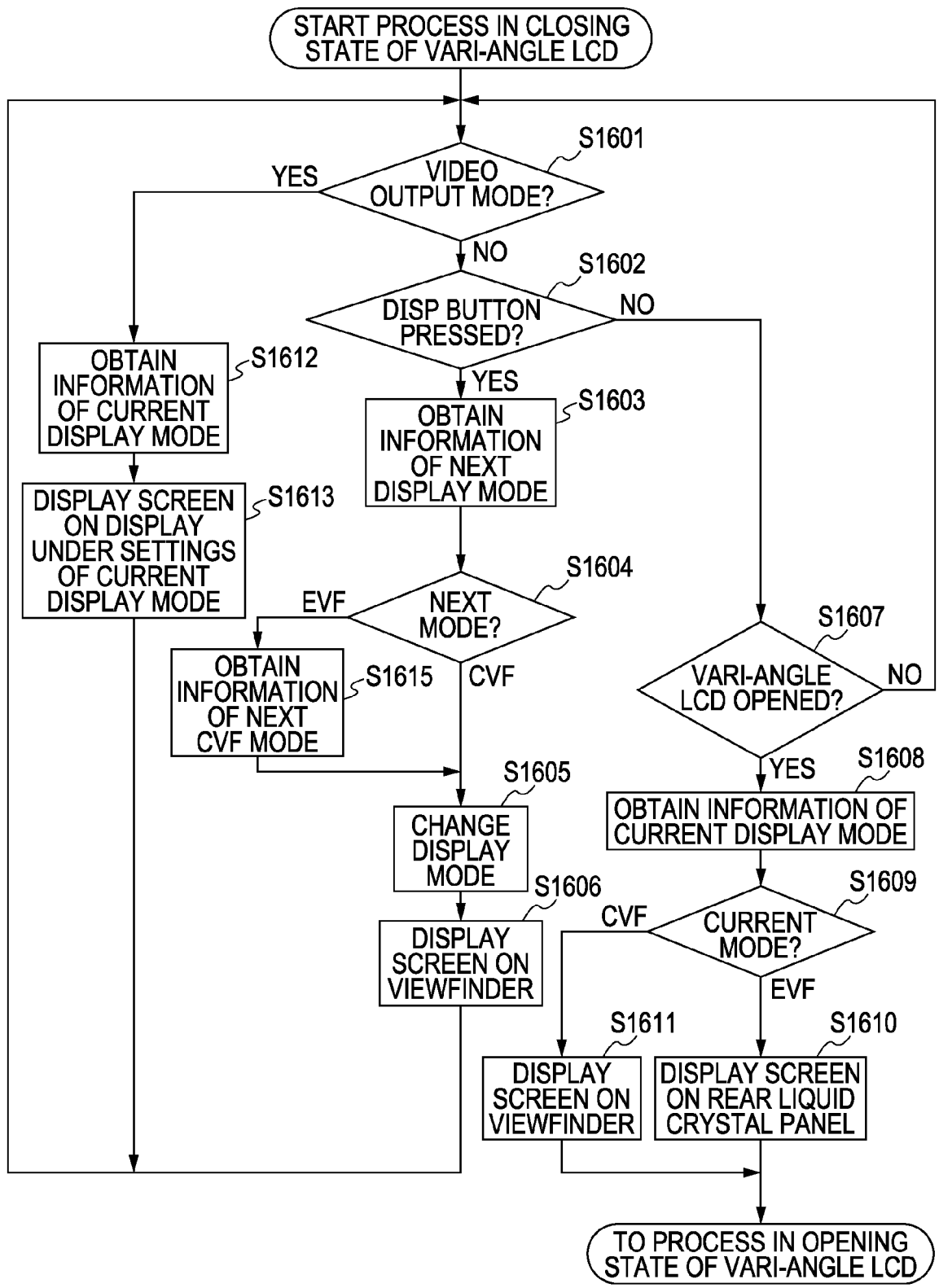
FIG. 16 is a flowchart illustrating a display process according to the second embodiment.

FIG. 15 illustrates the process in a case where the vari-angle LCD 1201 is initially opened.

First, the system control circuit 50 checks the state of the video output terminal 93, and determines whether the video output terminal 93 is set in the video output mode (step S1501).

If it is determined that the video output terminal 93 is not set in the video output mode, the system control circuit 50 determines whether the DISP button 1203 has been pressed (step S1502).

If it is determined that the DISP button 1203 has been pressed, the system control circuit 50 obtains information of a next display mode (step S1503). The next display mode is a mode to which the display mode is changed among the display modes, except for a display mode that is disabled.

When the information of the next display mode is obtained, the system control circuit 50 changes the display mode (step S1504).

When the display mode is changed, the system control circuit 50 determines whether the current mode (to which the mode has been changed in step S1504) is an EVF mode or a CVF mode (step S1505).

If it is determined that the current mode is an EVF mode, the system control circuit 50 displays a screen on the rear liquid crystal panel 1201 according to the information obtained in step S1503 (step S1506). If it is determined that the current mode is a CVF mode, the system control circuit 50 displays a screen on the viewfinder 1202 according to the information obtained in step S1503 (step S1507).

If it is determined in step S1502 that the DISP button 1203 has not been pressed, the system control circuit 50 checks the state of the switch 1206, and determines whether the vari-angle LCD 1201 has been closed (step S1508).

If it is determined that the vari-angle LCD 1201 has not been closed, the process returns to step S1501. If it is determined that the vari-angle LCD 1201 has been closed, the system control circuit 50 obtains information of the current display mode (step S1509).

Upon obtaining the information of the display mode, the system control circuit 50 determines whether the current mode is an EVF mode or a CVF mode (step S1510).

If it is determined that the current mode is a CVF mode, the system control circuit 50 displays a screen on the viewfinder 1202 according to the information obtained in step S1509 (step S1512). Then, the process proceeds to a closing state process in the flowchart illustrated in FIG. 16 (discussed below).

If it is determined that the current mode is an EVF mode, the system control circuit 50 displays a screen on the viewfinder 1202, rather than on the rear liquid crystal panel 1201, according to the information obtained in step S1509 (step S1511). Then, the process proceeds to the closing state process in the flowchart illustrated in FIG. 16.

If it is determined in step S1501 that the video output terminal 93 is set in the video output mode, the system control circuit 50 obtains information of the current display mode (step S1513). Then, the system control circuit 50 displays a screen on the display according to the information obtained in step S1513 (step S1514).

Then, the process in a case where the vari-angle LCD 1201 is initially closed will be described with reference to FIG. 16.

First, the system control circuit 50 checks the state of the video output terminal 93, and determines whether the video output terminal 93 is set in the video output mode (step S1601).

If it is determined that the video output terminal 93 is not set in the video mode, the system control circuit 50 determines whether the DISP button 1203 has been pressed (step S1602). If it is determined that the DISP button 1203 has been pressed, the system control circuit 50 obtains information of a next display mode (step S1603).

Upon obtaining the information of the next display mode, the system control circuit 50 determines whether the next mode is an EVF mode or a CVF mode (step S1604).

If it is determined that the next mode is a CVF mode, the system control circuit 50 changes the display mode (step S1605). Then, a screen is displayed on the viewfinder 1202 according to the information obtained in step S1603 or S1615 (discussed below) (step S1606). Then, the process returns to step S1601.

If it is determined in step S1604 that the next mode is an EVF mode, the system control circuit 50 determines that the EVF mode is disabled, and obtains information of the next CVF mode (step S1615). Then, the process proceeds to step S1605.

If it is determined in step S1602 that the DISP button 1203 has not been pressed, the system control circuit 50 checks the state of the switch 1206, and determines whether the vari-angle LCD 1201 has been opened (step S1607).

If it is determined that the vari-angle LCD 1201 has not been opened, the process returns to step S1601. If it is determined that the vari-angle LCD 1201 has been opened, the system control circuit 50 obtains information of the current display mode (step S1608).

Upon obtaining the information of the current display mode, the system control circuit 50 determines whether the current mode is an EVF mode or a CVF mode (step S1609).

If it is determined that the current mode is a CVF mode, the system control circuit 50 displays a screen on the viewfinder 1202 according to the information obtained in step S1608 (step S1611). Then, the process proceeds to the opening state process in the flowchart illustrated in FIG. 15.

If it is determined that the current mode is an EVF mode, the system control circuit 50 displays a screen on the rear liquid crystal panel 1201 according to the information obtained in step S1608 (step S1610). Then, the process proceeds to the opening state process in the flowchart illustrated in FIG. 15.

If it is determined in step S1601 that the video output terminal 93 is set in the video output mode, the system control circuit 50 obtains information of the current display mode (step S1612).

Then, the system control circuit 50 displays a screen on the display according to the information obtained in step S1612 (step S1613).

According to the second embodiment, display mode control in consideration of the video output mode and the state of the vari-angle LCD can be achieved. As a result, the user can view a screen in a natural display manner without changing the display mode settings while worrying about the video output mode or the state of the vari-angle LCD.

The present invention may also be achieved by using a recording medium storing program code for software implementing the functions of the embodiments described above. That is, the program code stored in the recording medium can be read and executed by a computer (or a central processing unit (CPU) or a micro processing unit (MPU)) of a system or an apparatus, thereby achieving the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-031044 filed Feb. 8, 2006 and No. 2007-004674 filed Jan. 12, 2007, which are hereby incorporated by reference herein in its entirety.

What is claimed:

1. A display control apparatus for controlling display of image data on a display unit, comprising:
   a setting unit configured to set information to be displayed for each of a plurality of display modes;
   a mode changing unit configured to change a display mode displayed;
   a display control unit configured to control the display unit to display the information set by the setting unit according to the display mode displayed changed by the mode changing unit; and
   a disabling setting unit configured to disable a display mode designated by a user from among the plurality of display modes,
   wherein the mode changing unit is operable to change display modes by sequentially changing display modes that are not disabled by the disabling setting unit.

2. An image pickup apparatus comprising:
   a display control apparatus for controlling display of image data on a display unit, the display control apparatus including,
      a setting unit configured to set information to be displayed for each of a plurality of display modes;
      a display mode changing unit configured to change a display mode displayed;
      a display control unit configured to control the display unit to display the information set by the setting unit according to the display mode displayed changed by the mode changing unit; and
      a disabling setting unit configured to disable a display mode designated by a user from among the plurality of display modes,
      wherein the mode changing unit is operable to change display modes by sequentially changing display modes that are not disabled by the disabling setting unit;
   an image-capturing unit configured to capture an image of an object; and
   at least one display unit on which the captured image and information concerning capturing are displayable.

3. An image pickup apparatus according to claim 2, wherein,
   the at least one display unit includes a plurality of display units including a first display unit and a second display unit;
   the plurality of display modes include a mode for displaying the information on the first display unit, and a mode for displaying the information on the second display unit; and
   the display control unit is operable to change the display unit that performs display according to the plurality of display modes.

4. An image pickup apparatus according to claim 3, wherein the first display unit is a display panel disposed on a rear surface of the image pickup apparatus, and the second display unit is a viewfinder.

5. An image pickup apparatus according to claim 3, wherein,
   the first display unit is movable; and
   when a surface of the first display unit on which the information is displayed faces the image-capturing unit of the image pickup apparatus, the display mode changing unit is not operable to perform a display mode change to a mode for displaying the information on the first display unit regardless of whether a desired display mode has been disabled by the disabling setting unit.

6. An image pickup apparatus according to claim 2, wherein,
   a first display unit is movable; and
   the image pickup apparatus is arranged so that when the first display unit is moved so as to face the image-capturing unit in a state where the information is being displayed on the first display unit in a mode for displaying the information on the first display unit, the display control unit displays the information on a second display unit.

7. An image pickup apparatus according to claim 3, wherein,
   the first display unit is movable; and
   the image pickup apparatus is arranged so that when the first display unit is moved so as to face the image-capturing unit in a state where the information is being displayed on the first display unit in a mode for displaying the information on the first display unit, the display control unit displays on the second display unit the information that is being displayed in the mode for displaying the information on the first display unit.

8. An image pickup apparatus according to claim 3, wherein,
the first display unit is movable; and
when the first display unit is moved so as to face the image-capturing unit in a state where the information is being displayed on the first display unit in a mode for displaying the information on the first display unit, the display control unit displays the information on the second display unit regardless of whether a desired display mode has been disabled by the disabling setting unit.

9. An image pickup apparatus according to claim 2, further comprising a notifying unit configured to notify a display mode change state when the display mode changing unit performs a display mode change.

10. An image pickup apparatus according to claim 2, further comprising a notifying unit that notifies the display mode changing unit is not allowed to perform a display mode change.

11. A method for controlling an image pickup apparatus comprising:
capturing an image of an object;
displaying the captured image and information concerning image capture;
setting information to be displayed for each of a plurality of display modes;
changing the display modes;
controlling display of the set information according to the changed display modes; and
disabling a display mode designated by a user from among the plurality of display modes,
wherein changing display modes changes the plurality of display modes by sequentially changing display modes that are not disabled.

12. A non-transitory computer readable medium containing computer-executable instructions for controlling an image pickup apparatus, the computer readable medium comprising:
computer-executable instructions for capturing an image of an object;
computer-executable instructions for displaying the captured image and information concerning image capture;
computer-executable instructions for setting information to be displayed for each of a plurality of display modes;
computer-executable instructions for changing the plurality of display modes;
computer-executable instructions for controlling display of the set information according to the changed display modes; and
computer-executable instructions for disabling a display mode designated by a user from among the plurality of display modes,
wherein changing the plurality of display modes changes the plurality of display modes by sequentially changing display modes that are not disabled.

* * * * *